Jan. 7, 1964     H. A. EBERHARDT     3,116,694
PUMP DISCHARGE PRESSURE CONTROL MECHANISM
Filed June 16, 1961     2 Sheets-Sheet 1

INVENTOR
HARRY A. EBERHARDT
BY
Howson & Howson
ATTYS.

Jan. 7, 1964   H. A. EBERHARDT   3,116,694
PUMP DISCHARGE PRESSURE CONTROL MECHANISM
Filed June 16, 1961   2 Sheets-Sheet 2

INVENTOR
HARRY A. EBERHARDT
BY Howson & Howson
ATTYS.

United States Patent Office 3,116,694
Patented Jan. 7, 1964

3,116,694
PUMP DISCHARGE PRESSURE CONTROL MECHANISM
Harry A. Eberhardt, Bridgeport, Pa., assignor to Hale Fire Pump Company, Conshohocken, Pa., a corporation of Pennsylvania
Filed June 16, 1961, Ser. No. 117,637
8 Claims. (Cl. 103—19)

This invention relates to control mechanism for pumps driven by a variable speed prime mover which mechanism is operable to maintain pump discharge at a predetermined relatively constant pressure.

In some fire fighting systems wherein a pump supplies one or more hose lines, the throttle or other speed control device for the pump is regulated to provide a predetermined pump discharge pressure for a predetermined number of hose lines. Thereafter the pump discharge pressure fluctuates if the number of lines supplied varies from the predetermined number. For example, closing one or more of the hose lines causes a sudden increase in pump pressure and/or in the remaining lines and conversely opening additional lines causes a sudden pressure drop in the pump and the lines. It is readily appreciated that a sudden increase or decrease in line pressure may present a hazard to those attending the lines in which the pressure increase or decrease is reflected.

In prior attempts to correct this problem a control mechanism is provided in the system which senses fluctuations in the pump discharge pressure and regulates the pump prime mover to control the pump discharge pressure. Some of these control mechanisms include an actuatable pressure responsive diaphragm which is connected to the pump throttle through a system of linkages. A major disadvantage of these mechanisms is the tendency of the mechanism to "hunt" or set up a repetitive pressure cycling which is caused by "over controlling," lost motion and friction in the mechanism. Another disadvantage is that the comparatively small deflection of the diaphragm limits the degree of adjustability of these mechanisms.

With the foregoing in mind an object of the present invention is to provide a pressure responsive control mechanism directly connected to the pump throttle and which senses discharge pressure increases above a predetermined pressure and immediately regulates the throttle to provide a predetermined relatively constant discharge pressure without any appreciable delay between the pressure sensing and regulating operation.

Another object of the present invention is to provide a control mechanism which is selectively adjustable so that pump discharge pressures may be regulated within a wide range.

A further object of the present invention is to provide a control mechanism wherein the tendency of the control device to override and set up repetitive pressure cycling or "hunting" is minimized.

A still further object of the present invention is to provide a control mechanism of the above type which is adapted for use with various commercial engine and pump combinations, which is fully effective in operation and use and is extremely economical to manufacture.

An additional object of the present invention is to provide an improved control mechanism that is responsive to pump discharge pressure only and will not be affected adversely by changing inlet or hydrant pressure at the pump.

These and other objects of the present invention and the various features and details of the operation and construction thereof are hereinafter more fully set forth with reference to the accompanying drawings, in which.

Figure 1:
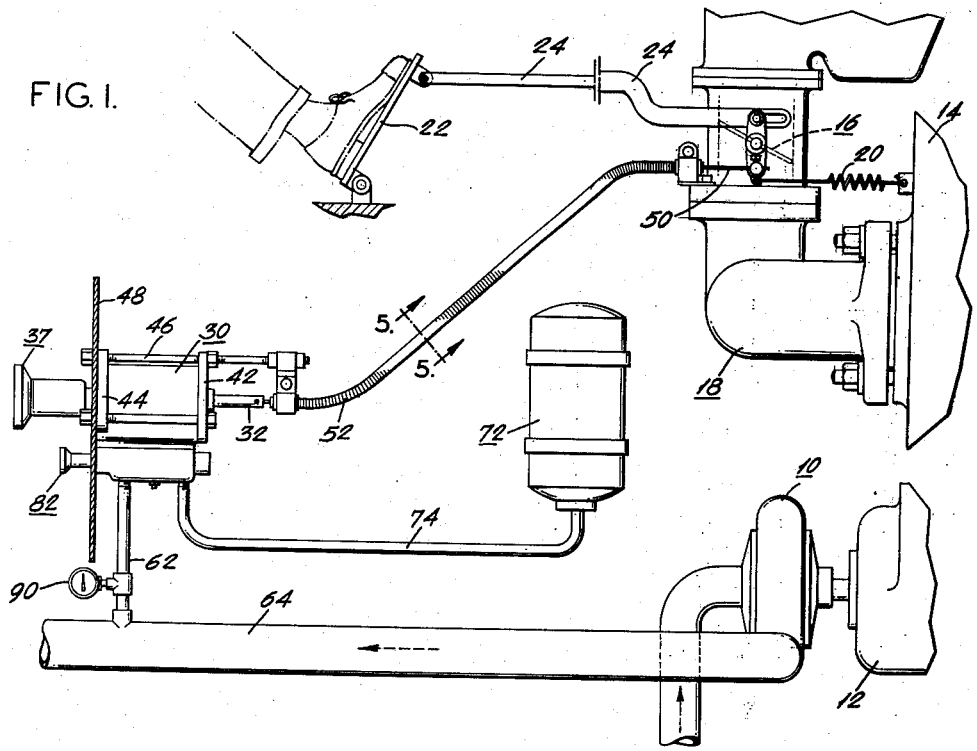
FIG. 1 shows diagrammatically a conventional centrifugal pump driven through a transmission of an internal combustion engine and control mechanism in accordance with the present invention for controlling pump discharge pressure.

Referring now to the drawings, there is shown in FIG. 1 a diagrammatic representation of a control mechanism made according to the present invention and operable to control the discharge pressure of a conventional centrifugal pump 10 which in the present instance is driven through a transmission 12 by a conventional internal combustion engine 14 of a fire truck or the like. The usual throttle 16, mounted in the intake manifold 18 of the engine and actuated by the customary foot pedal 22 through a linkage 24 against a spring 20, controls the output of the engine.

Figure 2:
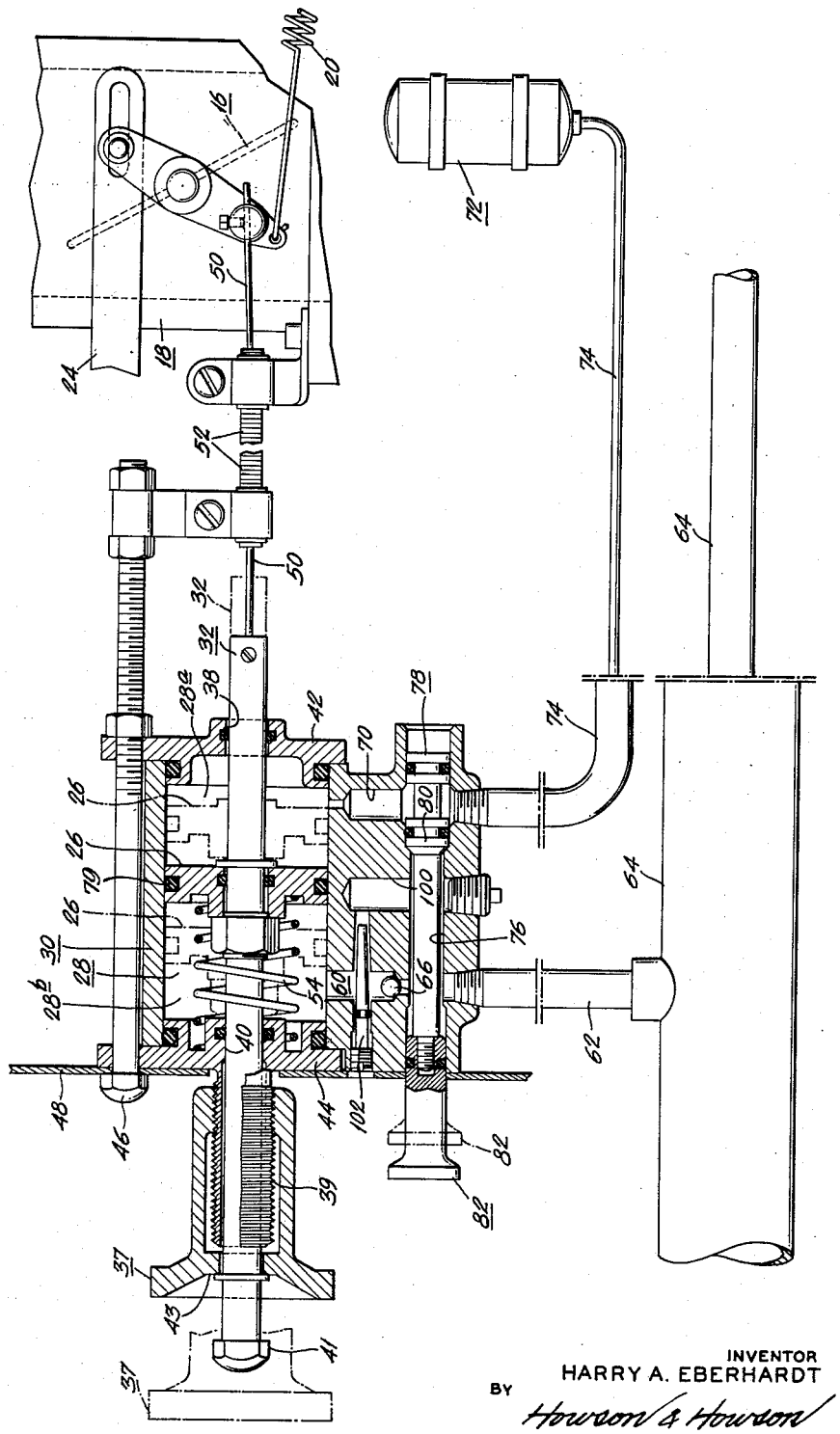
FIG. 2 is an enlarged longitudinal sectional view of the control mechanism shown in FIG. 1 in position for operation.

Referring to FIG. 2, the control mechanism comprises a body portion 30 including an elongated cylindrical chamber 28 and a piston 26 mounted for axial movement therein which divides the chamber 28 into inner and outer sections 28$^a$ and 28$^b$ respectively. The piston 26 is mounted on a shaft 32 and this shaft projects axially from the opposite faces of the piston 26 through openings 38 and 40 in end plates 42 and 44 which cover the inner and outer axial ends of the chamber 28 respectively. The end plates 42 and 44 are secured to the body portion by means of elongated bolts 46 which also mount the control mechanism on a panel 48 located, for example, on the side of the fire truck.

A feature of the present invention resides in the provision of means directly connecting the piston 26 to the throttle 16. This is accomplished by a control wire 50 housed in a flexible cable 52 which is connected at one end to the outer end of the shaft 32 and at its other end to the throttle 16 so that movement of the piston 26 in one direction to the left with respect to FIG. 2 opens the throttle 16 and increases the output of the engine and movement in the opposite direction to the right closes the throttle 16 and decreases the output of the engine. A coil spring 54 is mounted in the outer section 28$^b$ of the piston chamber which normally urges the piston 26 to the right and acts in conjunction with the coil springs 20 to bias the throttle 16 to the closed position when, for example, the fluid pressure on both sides of the piston is equal. In the present instance the cable 52 is secured at one end to the bolt 46 adjacent the control mechanism and at its other end to a flange on the intake manifold adjacent the throttle 16. By reason of this direct connection of the piston 26 to the throttle 16, the throttle 16 is immediately responsive to pressure changes in the system causing movement of the piston 26 and minimizes the problem of lost motion and friction of prior known linkage mechanisms which causes "hunting."

Another feature of the present invention for minimizing "hunting" by reducing friction in the mechanism is the provision of a liner 104 on the inner peripheral surface of the cable 52 which is made of a low friction plastic and which, being substantially inert, acts as a lubricant. Accordingly there are substantially no frictional forces retarding movement of the wire 50 in the cable 52 and therefore there is an immediate and accurate transfer of control piston impulses to the throttle 16.

In accordance with the present invention, the piston 26 is responsive to changes in the pump discharge pressure and is operable to regulate the throttle 16 when the discharge pressure varies from a predetermined reference pressure. This is accomplished by connecting the outer section 28b of the piston chamber to the pump discharge and providing means establishing a reference pressure in the inner section 28a of the chamber 28. In the present instance the outer section 28b communicates with the discharge conduit 64 of the pump through a passageway 60 in the body portion, a valve channel 76 and a line 62 connecting the outer end of the valve channel 76 to the discharge conduit 64. The inner section 28a is connected to an air accumulator 72 through a second passageway 70 in the body portion, the valve channel 76 and a line 74 connecting the inner end of the valve channel 76 and the air accumulator 72. The channel 76 may interconnect the passageways 62 and 70 under the control of a valve 78 mounted for sliding movement therein. The valve 78 has a piston 80 at one end and a control knob 82 at its opposite end and is movable between an inner position opening flow between the line 62 and passageway 70 (see FIG. 4) and an outer position closing communication between the line 62 and passageway 70 (see FIG. 2).

With the valve 78 in the inner position, fluid from the discharge side of the pump enters both sections of the chamber 28 and the air accumulator 72 thereby compressing the air in the accumulator 72 until the pressure in the chamber is equal to the discharge pressure. It is noted that the air in the accumulator 72 is usually at atmospheric pressure prior to admission of fluid from the discharge side of the pump therein. Thereafter the valve 78 is moved to the outer position shown in FIG. 2 thereby sealing off the inner section 28a of the chamber 28 from the discharge conduit 64 and thereby establishing a reference pressure in the inner section 28a of the chamber 28. It is noted that for accurate operation of the mechanism, it is necessary that the chamber sections 28a and 28b be sealed from one another to prevent flow of fluid therebetween and to this end the piston 26 is provided with a sealing element 79 in the form of an O ring, quad ring or the like. Accordingly after the desired reference pressure has been established in the inner section 28a of the mechanism, a decrease in the discharge pressure below the reference pressure effects movement of the piston 26 to the left to open the throttle 16. Likewise, an increase of the discharge pressure above the reference pressure effects movement of the piston 26 to the right to close the throttle 16. Since the stroke of the piston 26 is greater than the deflection of the diaphragm of prior mechanisms, the degree of adjustment of the throttle 16 may be controlled more precisely and over a wider range.

An important feature of the present invention is the provision of means for effecting immediate actuation of the piston 26 to close the throttle 16 on dangerous rising pressure situations and dampening means for delaying movement of the piston 26 and consequently opening of the throttle 16 when the pump discharge pressure decreases below the reference pressure thereby minimizing the tendency of the control mechanism to hunt or set up a repetitive pressure cycling. To this end a ball check 66 is mounted in the passageway 60 which permits free flow of fluid into the outer section 28b of the chamber and a tapered needle valve 102 is provided between the passageway 60 and a channel 100 which intersects the channel 76 to limit flow out through the passageway 60. The needle valve 102 is selectively adjustable so that the rate of opening of the throttle 16 on falling pressure situations may be controlled selectively.

A manual hand throttle knob 37 is provided for selectively controlling actuation of the throttle 16 and in the present instance is mounted on a collar 39 projecting from the end plate 44 and within which the shaft 32 is free to move axially. The outer end of the shaft 32 mounts a cap nut 41 adapted to engage a shoulder 43 on the knob 37. Accordingly as the knob 37 is threaded axially outwardly of the collar 39, the shaft is moved outwardly to the left, in turn moving the piston 26 to the left and thereby opening the throttle 16.

The hand throttle 37 may be used to minimize hunting and over-controlling by limiting the extent to which the throttle 16 may close. This is accomplished by setting the control knob 37 at a selected position short of the extreme inner position of the knob shown in solid lines in FIG. 2. Accordingly when the pump discharge pressure rises above the reference pressure, for example, and the piston 26 moves to the right to close the throttle 16, the engagement of the cap nut 41 with the control knob 37 prevents the throttle 16 from closing completely.

Figure 3:
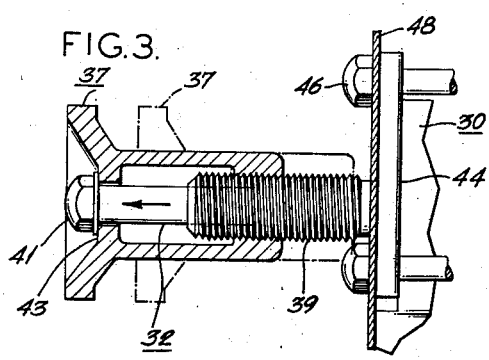
FIG. 3 is an enlarged fragmentary sectional view showing one of the components of the control mechanism in a position for initially setting the discharge pressure.
Figure 5:
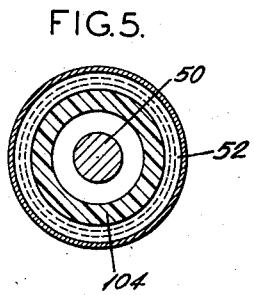
FIG. 5 is an enlarged sectional view taken on line 5—5 of FIG. 1.
Figure 4:
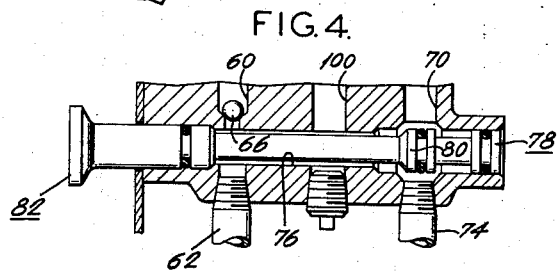
FIG. 4 is an enlarged fragmentary sectional view showing the internal arrangement of a part of the control mechanism in a position for initially setting the discharge pressure.

The control mechanism of the present invention is used to maintain pump discharge at a predetermined relatively constant pressure in the following manner. With the valve 78 in its inner position, as shown in FIG. 4, both sides of the piston 26 are exposed to pump discharge pressure. Consequently, the piston is hydraulically balanced so that changing discharge pressure will not influence its position. The springs 54 and 20 will hold the cap nut 41 against the shoulder 43 as shown in FIG. 3. The hand control knob 37 is now turned outwardly to set the pump discharge at the desired discharge pressure as indicated by the gauge 90 (see FIG. 1).

After the air in the tank 72 has been compressed to correspond to the desired discharge pressure, the slide valve 78 is moved to the outer position (see FIG. 2) whereby the piston 80 closes off the passageway 70 from the channel 76 and isolates the inner section 28a of the piston chamber and the accumulator 72 from the pump discharge conduit 64. Consequently, a constant reference pressure is established in the inner section 28a of the piston chamber. The manual control knob is then threaded inwardly a predetermined distance. The shaft 32 is freely slidable with respect to the knob 37 and the cap nut 41 is now held out of engagement with the shoulder 43 as shown in FIG. 2 by the reference pressure acting on piston 26. The piston 26 is now balanced and will tend to remain in a fixed position so long as the pump discharge pressure remains constant at the discharge level which is substantially equal to the reference pressure.

An increase in pump discharge pressure caused, for example, by closing one or more hose lines supplied by the pump effects an increase in pressure in the outer section 28b of the piston chamber, unbalances the piston 26 and causes it to move to the right thereby closing the throttle 16 and reducing the output of the engine and accordingly lowering the output of the pump until the pump discharge pressure reaches the desired pressure level. The response in the piston chamber is immediate because of the substantially unrestricted flow through the ball check 66. Accordingly it is readily apparent that sudden increase in pressure above the reference pressure is immediately sensed and compensated for by the control mechanism of the present invention.

Conversely when the pump discharge pressure drops below the reference pressure, the lower pressure in the outer section 28b of the piston chamber unbalances the piston 26 causing it to be moved to the left with respect to FIG. 2 which through the wire 50 opens the throttle 16 and in turn increases the output of the engine to increase the pump output until the pressure is brought back up to the desired pressure. The response in the piston chamber is delayed since the fluid must pass outward from the chamber through the needle valve 104.

While a particular embodiment of the present invention has been illustrated and described herein, it is to be understood that changes and modifications may be incorporated within the scope of the following claims.

I claim:

1. In combination a pump, means for driving the pump, a throttle for regulating the output of the pump and control mechanism comprising a body member having a chamber therein and a single piston reciprocably mounted in said chamber and dividing said chamber into inner and outer sections, means defining a passageway connecting said outer section to the discharge side of the pump, means for establishing a predetermined reference pressure in the inner section, means directly connecting the piston to the throttle whereby said piston and throttle move together as a unit, control means in said passageway for permitting free flow of fluid from said pump discharge into said outer section and limiting flow of fluid from said outer section to said pump discharge side thereby to effect movement of said piston at a predetermined rate to close the throttle when the discharge pressure exceeds the predetermined pressure and movement of said piston at a rate slower than said predetermined rate to open the throttle when the discharge pressure is less than said predetermined pressure.

2. The combination claimed in claim 1 wherein said control means includes a ball check in said first passageway operable to permit flow into and restrict flow out of said outer section, a bypass connecting said outer section to said discharge side of the pump and an adjustable element in said bypass for selectively limiting flow of fluid from said outer section to said discharge side, whereby decrease in pressure below said predetermined pressure causes flow of fluid from said outer section through said limited opening to thereby control movement of said piston to increase output of the pump.

3. The combination claimed in claim 1 wherein said means directly connecting said piston to said throttle includes a flexible hollow cable fixed at one end adjacent the control mechanism and having means at its opposite end for connecting to the means for driving the pump and a control wire movably mounted in said cable connected at one end to the piston and having means at its other end for connecting to the throttle.

4. The combination claimed in claim 3 including means mounting said wire for substantially friction-free movement in said cable.

5. The combination claimed in claim 1 including means for manually moving said piston axially of said chamber to open the throttle.

6. The combination claimed in claim 5 including a hollow collar communicating with said outer section of said chamber and wherein said manual regulating means comprises a shaft projecting axially from one face of said piston through said collar, a control knob and means mounting said knob for movement axially of said collar, said knob cooperatively engaging said shaft to effect movement of said piston upon axial movement of said knob relative to said collar.

7. In combination a pump, means for driving the pump, a throttle for regulating the output of the pump and control mechanism comprising a body member having a chamber therein and a single piston reciprocably mounted in said chamber and dividing said chamber into inner and outer sections, means defining a first passageway connecting said outer section to the discharge side of the pump, means for establishing a predetermined reference pressure in the inner section including an air accumulator, pressure responsive means and a second passageway connecting said air accumulator to said inner section, means directly connecting the piston to the throttle whereby said piston and throttle move together as a unit, control means in one of said passageways for permitting free flow of fluid in one direction in said passageway when the pump discharge pressure exceeds said predetermined pressure and limiting flow of fluid in a direction opposite said one direction when the pump discharge pressure is less than said predetermined pressure thereby to effect movement of said piston at a predetermined rate to close the throttle when the discharge pressure exceeds the predetermined pressure and movement at a rate slower than said predetermined rate to open the throttle when the discharge pressure is less than said predetermined pressure.

8. The combination claimed in claim 7 including means defining a channel connecting said first and second passageways, a control valve in said channel movable between an inner position permitting free flow of fluid to said inner and outer sections and said air accumulator to establish a predetermined reference pressure in said inner section of the piston chamber and an outer position closing flow of fluid to said inner section and accumulator and permitting flow of fluid between said outer section and the discharge side of the pump.

References Cited in the file of this patent

UNITED STATES PATENTS

| | | |
|---|---|---|
| 862,867 | Eggleston | Aug. 6, 1907 |
| 865,388 | Hill | Sept. 10, 1907 |
| 902,001 | Rateau | Oct. 27, 1908 |
| 1,396,237 | Veenschoten | Nov. 8, 1921 |
| 1,685,868 | Schleyer | Oct. 2, 1928 |
| 1,775,613 | Ferris | Sept. 9, 1930 |
| 2,406,209 | Fausz | Aug. 20, 1946 |
| 2,420,515 | Barton | May 13, 1947 |
| 2,690,712 | Foote | Oct. 5, 1954 |
| 2,752,858 | Berges | July 3, 1956 |
| 2,787,917 | Schroeder | Apr. 9, 1957 |
| 2,896,541 | Barton | July 28, 1959 |
| 2,959,982 | Cadwallader | Nov. 15, 1960 |